(12) United States Patent
Subramaniam

(10) Patent No.: US 12,204,697 B2
(45) Date of Patent: Jan. 21, 2025

(54) COMPRESSIBLE ENERGIZING ELEMENTS

(71) Applicant: Hewlett-Packard Development Company, L.P., Spring, TX (US)

(72) Inventor: Ravi Shankar Subramaniam, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/261,103

(22) PCT Filed: Jan. 25, 2021

(86) PCT No.: PCT/US2021/014885
§ 371 (c)(1),
(2) Date: Jul. 11, 2023

(87) PCT Pub. No.: WO2022/159111
PCT Pub. Date: Jul. 28, 2022

(65) Prior Publication Data
US 2024/0319799 A1  Sep. 26, 2024

(51) Int. Cl.
*G06F 3/02* (2006.01)
*G06F 3/01* (2006.01)

(52) U.S. Cl.
CPC ............ *G06F 3/0202* (2013.01); *G06F 3/016* (2013.01)

(58) Field of Classification Search
CPC ....... G06F 3/0202; G06F 3/016; H03K 17/97; H03K 2017/9706
USPC .......................................................... 345/168
See application file for complete search history.

(56) References Cited

U.S. PATENT DOCUMENTS

| | | | |
|---|---|---|---|
| 4,085,394 A * | 4/1978 | Weisenburger | H03K 17/97 336/20 |
| 5,220,318 A | 6/1993 | Staley | |
| 5,506,369 A | 4/1996 | Kawamura et al. | |
| 8,300,023 B2 | 10/2012 | Forutanpour et al. | |
| 9,978,543 B1 | 5/2018 | Loo et al. | |
| 2004/0218963 A1 | 11/2004 | Van Diepen et al. | |
| 2016/0217953 A1* | 7/2016 | Ely | G06F 3/0202 |
| 2020/0358438 A1* | 11/2020 | Casparian | H01F 7/0273 |

FOREIGN PATENT DOCUMENTS

| | | |
|---|---|---|
| CN | 101409164 A | 4/2009 |
| JP | 05046296 A * | 2/1993 |
| RU | 2113008 C1 | 6/1998 |

OTHER PUBLICATIONS

Porter, "This Kickstarter keyboard combines 1970s tech with magnets to make every key", Aug. 1, 2019, pp. 8. Online available at : https://www.theverge.com/circuitbreaker/2019/8/1/20747554/keystone-keyboard-input-club-kickstarter-beam-spring-hall-effect-silo-switches.
Telcontar, "Hall effect keyboards", May 22, 2020, Telcontar, pp. 20.

\* cited by examiner

*Primary Examiner* — Mark Edwards
(74) *Attorney, Agent, or Firm* — Quarles & Brady LLP

(57) ABSTRACT

In some examples, a device can include a magnetic element coupled to a cap, a compressible energizing element surrounding the magnetic element, an electrical device coupled to the compressible energizing element to provide a current, and a processor resource to adjust a current applied to the compressible energizing element based on a selected resistance level.

20 Claims, 4 Drawing Sheets

COMPRESSIBLE ENERGIZING ELEMENTS

BACKGROUND

A computing device can allow a user to utilize computing device operations for work, education, gaming, multimedia, and/or other uses. Computing devices can be utilized in a non-portable setting, such as at a desktop, and/or be portable to allow a user to carry or otherwise bring the computing device with while in a mobile setting. These computing devices can utilize peripheral devices to provide inputs to the computing devices.

DETAILED DESCRIPTION

Figure 1:
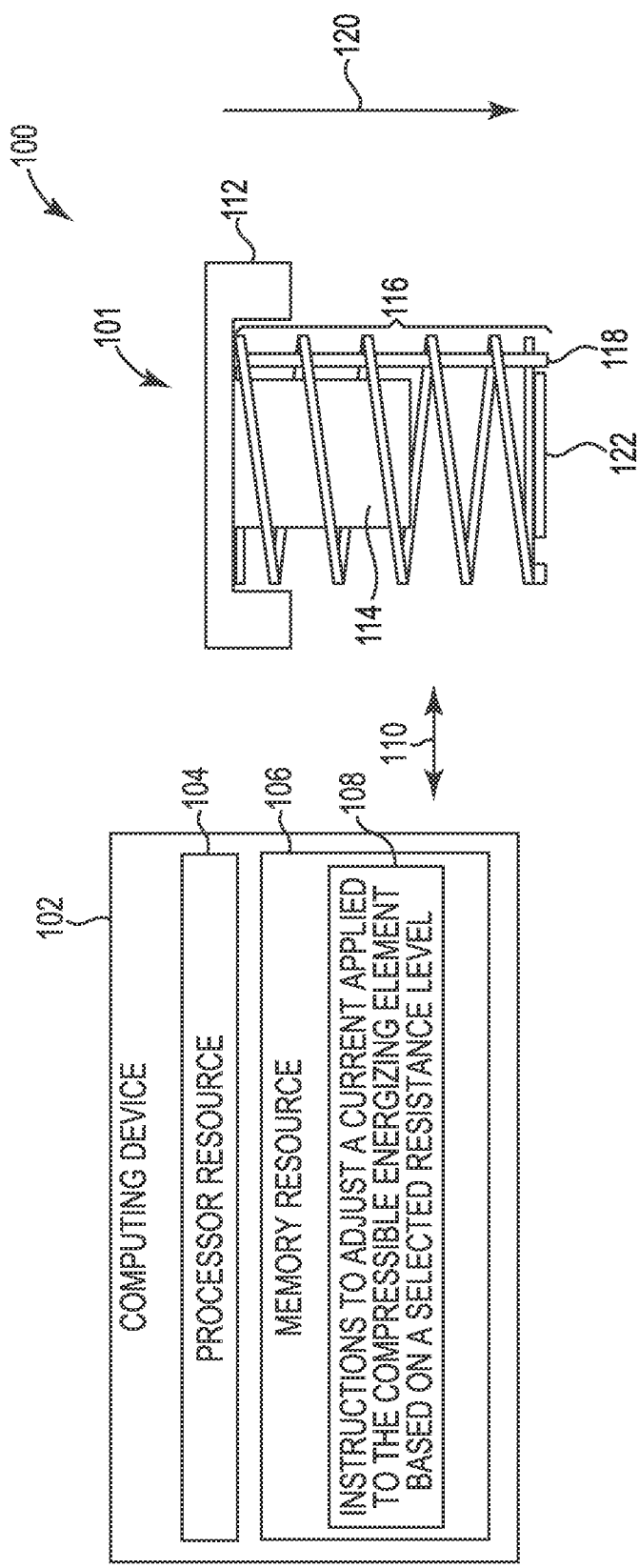
FIG. 1 illustrates an example of a system including a device that includes a compressible energizing element.

A user may utilize a computing device for various purposes, such as for business and/or recreational use. As used herein, the term "computing device" refers to an electronic system having a processor resource and a memory resource. Examples of computing devices can include, for instance, a laptop computer, a notebook computer, a desktop computer, an all-in-one (AIO) computer, networking device (e.g., router, switch, etc.), and/or a mobile device (e.g., a smart phone, tablet, personal digital assistant, smart glasses, a wrist-worn device such as a smart watch, etc.), among other types of computing devices. As used herein, a mobile device refers to devices that are (or can be) carried and/or worn by a user.

In some examples, the computing device can be utilized to perform particular functions with peripheral devices. For example, peripheral devices can be utilized to provide inputs to the computing device. In some examples, peripheral devices can include keys or buttons that can be positioned within an enclosure. In some examples, the keys or buttons can be arranged to form a keyboard. As used herein, the term "keyboard" refers to a plurality of keys that provide inputs to a computer or typewriter. Keyboards can utilize different mechanical elements to transfer a physical movement of a keystroke to a signal that can be transmitted to a computing device or transferred to a mark of a typewriter. Keyboards can utilize different mechanical elements to provide a different feel or response to a user utilizing the keyboard. In some examples, a user experience with the keyboard can be altered based on the feel or response of the plurality of keys of the keyboard. Previous keyboards may be limited by the physical components or elements of the keyboard or individual keys, such that the feel or response of the keys may be permanent or substantially permanent. This can create a positive experience for a first user, but a negative experience for a second user based on how the particular user interacts with the keyboard.

The present disclosure relates compressible energizing elements that can be utilized to alter a resistance or quantity of pressure to depress a particular key and/or alter a response of the particular key to return to an original position. In some examples, the compressible energizing element can surround a magnetic element of a key and compress with the magnetic element when the key is depressed by a user. In a similar way, the compressible energizing element can decompress or respond to an original state when the key is released to respond to the original position prior to being depressed.

In some examples, different current levels can be provided to the compressible energizing element, which can generate different intensities and densities for a magnetic field generated by the compressible energizing element. In some examples, each of the plurality of keys can be individually altered by altering the current level applied to the plurality of keys based on machine learning of usage patterns from a particular user. In this way, the feel and response of a particular keyboard can be altered based on a user profile for a plurality of users.

FIG. 1 illustrates an example of a system 100 including a device 101 that includes a compressible energizing element 116. In some examples, the system 100 can include a computing device 102 communicatively couped to the device 101 by a communication path 110. In some examples, the computing device 102 can be utilized to receive signals generated by the device 101 and/or utilized to alter a current provided to the compressible energizing element 116 of the device 101.

The device 101 can include a cap 112. In some examples, the cap 112 cam include a first surface or top surface that can be exposed to a user. In some examples, the cap 112 can be a portion of the device 101 to receive pressure from a user or other device. For example, the cap 112 can be presented as a key cap or key of a keyboard. In some examples, the cap can include a symbol or image on a surface of the cap 112 that can correspond to a signal that can be provided to the computing device 102 and/or correspond to a particular function that is performed by the computing device 102 in response to the signal. In some examples, pressure can be applied to the cap 112 in the direction of arrow 120 to move the cap 112 in the direction of 120.

In some examples, the cap 112 can be coupled to a magnetic element 114. As used herein, a "magnet" or "magnetic element" such as magnetic element 114 can include a material that generates a magnetic field. In some examples, the magnetic element 114 can comprise a material that attracts a substance such as iron or steel. In some examples, the magnetic element 114 can be a material that generates a magnetic field without an electric current passing through the material.

That is, in some examples, the magnetic element 114 is a permanent magnet or a non-electromagnetic magnet. In some examples, the magnetic element 114 can be coupled to a second side (e.g., bottom side, etc.) of the cap 112 using a mechanical or chemical bonding. For example, the magnetic element 114 can be attached to the cap 112 using a screw or other type of mechanical connection. In another example, the magnetic element 114 can be coupled to the cap 112 using an adhesive material. Thus, in some examples, the magnetic element 114 can be permanently or substantially permanently coupled to the cap 112. As used herein, "permanently" or "substantially permanently" coupled refers to a direct connection that is not intended to be broken and reattached. In this way, the movement of cap 112 can provide a corresponding movement of the magnetic element 114. That is, the cap 112 can be moved a particular distance and the magnetic element 114 can also move the particular distance. As described further herein, the magnetic element 114 can interact with a sensor (e.g., key contact) when the magnetic element 114 is moved in the direction of arrow 120 a particular distance. In some examples, a particular signal can be provided to the computing device 102 when the magnetic element 114 is depressed a particular distance in the direction of arrow 120 and/or when the magnetic element 114 is a particular distance away from the sensor.

In some examples, the device 101 can include a compressible energizing element 116 surrounding the magnetic element 114. In some examples, the compressible energizing element 116 can be "wrapped" around the magnetic element 114. For example, the compressible energizing element 116 can include a material with a first end and a second end. In this example, the first end can be moved around the surface of the magnetic element or wrapped around the surface of the magnetic element 114. In some examples, the compressible energizing element 116 can surround the magnetic element 114 in a "coil" formation. As used herein, a "coil" can refer to a spiral shape or a series of circles that surround another surface. For example, the magnetic element 114 can be in the shape of cylinder. In this example, the compressible energizing element 116 can be wrapped around the cylinder shaped magnetic element 114 in a circular motion to surround a surface of the magnetic element 114. Thus, in some examples, the compressible energizing element 116 can be an energized coil spring that allows the magnetic element 114 to move within energized coil spring as pressure is applied to the cap 112. In this way, the compressible energizing element 116 can act as a spring and an energizing element.

In some examples, the compressible energizing element 116 can comprise a conductive material that can receive and transfer an electrical current. As described herein, the compressible energizing element 116 can receive an electrical current and generate a magnetic field. In some examples, the compressible energizing element 116 can be a material that can be used to generate an electromagnet when a current is applied to the material. In some examples, the compressible energizing element 116 can be coupled to the cap 112 of the device 101 and/or a base 122 of the device 101.

In some examples, the compressible energizing element 116 can be compressed when the cap 112 is depressed or moved in the direction of arrow 120. As described herein, the compressible energizing element 116 can include a material that surrounds the magnetic element 114. In order for the compressible energizing element 116 to be compressible or move with the cap 112, space can exist within portions of the wrapped or surrounding magnetic element 114 to allow the compressible energizing element 116, cap 112, and/or magnetic element 114 to move together when pressure is applied to the cap 112 in the direction of arrow 120.

In some examples, the magnetic field of the compressible energizing element 116 can be altered based on a compression level of the compressible energizing element 116. As used herein, a "compression level" refers to a level or position of the energizing element 116 and/or a quantity of pressure applied to the energizing element 116. In some examples, the portions of the compressible energizing element 116 surrounding the magnetic element 114 can be pushed closer together when pressure is applied to the cap 112 in the direction of arrow 120. In this way, the density of the magnetic field generated by the compressible energizing element 116 can be increased when the cap 112 is depressed in the direction of arrow 120. In a similar way, the portions of the compressible energizing element 116 surrounding the magnetic element 114 can be moved further apart when the pressure is released from the cap 112 and the cap 112 and magnetic element are moved in the opposite direction of arrow 120. In this example, the density of the magnetic field generated by the compressible energizing element 116 can be lowered when the cap 112 and magnetic element are returning to an original position after being depressed and released.

In some examples, the device 101 can include an electrical device 118. As used herein, an "electrical device", such as electrical device 118, refers to a device that supplies an electrical current and/or electrical voltage. For example, the electrical device 118 can be an electrical generator that can generate an electrical current and/or electrical voltage and provide the current and/or voltage to an electrical circuit. In this way, the electrical device 118 can provide an electrical current through the compressible energizing element 116.

In some examples, the current level that is provided to the compressible energizing element 116 can correspond to a strength or intensity of the magnetic field generated by the compressible energizing element 116. For example, a relatively greater current level applied to the compressible energizing element 116 can provide a relatively greater magnetic field compared to a relatively lower current level, which can provide a relatively lower magnetic field. As described herein, the compressible energizing element 116 can provide a particular intensity based on the current level provided by the electrical device 118 and also provide a particular density based on the depression level of the compressible energizing element 116. That is, the intensity of the magnetic field can remain constant as the cap 112 is depressed in the direction of arrow 120 and the density of the magnetic field can increase as the cap 112 moves in the direction of arrow 120 and decrease as the cap 112 moves in the opposite direction of arrow 120. In some examples, the density of the magnetic field can increase when the portions of the compressible energizing element 116 surrounding the magnetic element 114 are pushed closer together as the cap 112 is moved in the direction of arrow 120. That is, the pressure on the cap 112 can compress the compressible energizing element 116 and move the magnetic element 114 in the same movement in the direction of arrow 120.

In some examples, the magnetic field generated by the compressible energizing element 116 can interact with the magnetic field of the magnetic element 114 and provide resistance to movement in the direction of arrow 120. That is, the magnetic field generated by the compressible energizing element 116 can be utilized to increase a resistance to movement of the cap 112 and/or magnetic element 114 in the direction of arrow 120. This can provide different responses or feel of the cap 112. For example, the cap can take more pressure or less pressure to move the cap 112 in the direction of arrow 120 based on the current level provided to the compressible energizing element 116. In addition, the density of the magnetic field can be altered based on the distance the cap 112 is depressed, since the compressible energizing element 116 is compressed by movement of the cap 112, which can compress portions of the compressible energizing element 116 to be closer together. In this way, the resistance can increase as the cap 112 and/or magnetic element 114 are depressed in the direction of arrow 120.

In some examples the computing device 102 can include a processor resource 104 communicatively coupled to a memory resource 106. As described further herein, the memory resource 106 can include instructions 108 that can be executed by the processor resource 104 to perform particular functions. In some examples, the computing device 102 can be associated with the device 101. For example, the computing device 102 can be utilized to execute instructions associated with functions of the device 101. In some examples, the computing device 102 can be local or remote to the device 101. For example, the computing device 102 can be a cloud resource that is remote from the device 101 or the computing device 102 can be within an enclosure that includes device 101 (e.g., within a keyboard, laptop, or other type of device.

In some examples, the computing device 102 can be communicatively coupled to the device 101 through a communication path 110. As used herein, a communication path, such as communication path 110, refers to a connection that allows signals to be transferred between devices or within a particular device. In these examples, the signals can be utilized to provide communication between different devices and/or components within a device. For example, the computing device 102 can utilize the communication path 110 to instruct the electrical device 118 to alter a current or voltage provided to the compressible energizing element 116.

As described herein, the computing device 102 can be utilized to control functions of the device 101 and/or receive inputs form the device 101. The computing device 102 can include components such as a processor resource 104. As used herein, the processor resource 104 can include, but is not limited to: a central processing unit (CPU), an application specific integrated circuit (ASIC), a field programmable gate array (FPGA), a metal-programmable cell array (MPCA), a semiconductor-based microprocessor, or other combination of circuitry and/or logic to orchestrate execution of instructions 108. In other examples, the computing device 102 can include instructions 108 stored on a machine-readable medium (e.g., memory resource 106, non-transitory computer-readable medium, etc.) and executable by a processor resource 104. In a specific example, the computing device 102 utilizes a non-transitory computer-readable medium storing instructions 108 that, when executed, cause the processor resource 104 to perform corresponding functions.

In some examples, the computing device 102 can include instructions 108 that can be executed by a processor resource 104 to adjust a current applied to the compressible energizing element 116 based on a selected resistance level. As described herein, a resistance provided by a generated magnetic field of the compressible energizing element 116 can correspond to the current applied to the compressible energizing element 116. In some examples, a greater current applied to the compressible energizing element 116 can correspond to a greater resistance. In a similar way, a lower current applied to the compressible energizing element 116 can correspond to a lower resistance.

In some examples, the computing device 102 can receive instructions to provide a particular resistance level to the device 101. In some examples, the computing device 102 can receive a particular resistance level for each of a plurality of devices that make up a keyboard. For example, each key of a keyboard can provide a corresponding particular resistance level. In this example, the computing device 102 can send signals to corresponding electrical devices of the devices to provide a corresponding current to the particular keys of the keyboard. In this way, different keys of a keyboard can have different resistance levels. In some examples, the different resistance levels for the plurality of keys can correspond to a particular user profile. For example, a particular user can generate a user profile that includes different resistance levels for different keys of a keyboard.

In some examples, the different resistance levels for the different keys can correspond to personal preferences, physical limitations, or typing patterns of the particular user. For example, the user may not be able to provide a particular level of force or pressure to a set of keys of the keyboard due to a physical limitation. In this example, the particular set of keys can be provided with a relatively lower level of current and have a relatively lower resistance, which can allow the user to depress the particular set of keys. In some examples, the computing device 102 can monitor typing from a particular user over a time period and adjust the resistance level of different keys of the keyboard based on the monitored typing. For example, the computing device can utilize machine learning techniques to determine particular keys that are pressed over a threshold pressure and/or under a threshold pressure and adjust the resistance of the particular keys accordingly. For example, a first portion of keys that are indicated to have a quantity of depressions that are above a threshold pressure can be provided with a greater current to increase the resistance to the first portion of keys. In this way, damage to the first portion of keys may be avoided. In another example, a second portion of keys that are indicated to have a quantity of depressions that are below a threshold pressure can be provided with a lower current to lower the resistance to the second portion of keys. In this way, the lower force applied to the second portion of keys can still provide a signal to the computing device 102 when depressed with the lower level of force.

In some examples, the computing device 102 can monitor typing of the particular user to determine a quantity of mistakes that are typed during a particular period of time. The computing device 102 can then determine if a resistance of a portion of keys can be adjusted to improve the typing or lower the quantity of mistakes. In a similar way, the computing device 102 can monitor typing of the particular user to determine if the typing style could lead to an injury (e.g., arthritis, etc.). In this example, the computing device 102 can alter the resistance of a portion of the keys to improve the typing style or alter the typing style in a way that could prevent injury.

Figure 2:
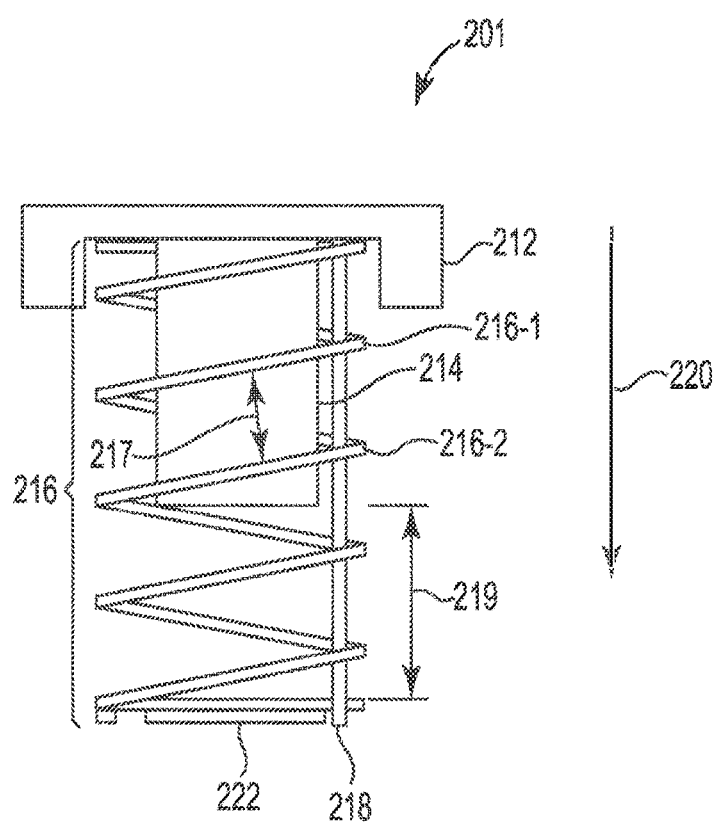
FIG. 2 illustrates an example of a key that includes a compressible energizing element.

FIG. 2 illustrates an example of a key 201 that includes a compressible energizing element 216. In some examples, the key 201 can be a device that can be a portion of a keyboard or other input device for a computing device (e.g., computing device 102 as illustrated in FIG. 1, etc.). In some examples, the key 201 can be the same or similar device as device 101 as illustrated in FIG. 1. For example, the key 201 can include a cap 212 that can be utilized to receive a force from a user or device. In some examples, applying pressure on the cap 212 can move the cap 212 in the direction of arrow 220.

In some examples, the cap 212 can be coupled to a magnetic element 214. As described herein, the magnetic element 214 can be a permanent magnet that can generate a magnetic field without an applied electrical current. In some examples, the magnetic element 214 can be permanently or substantially permanently coupled to a surface of the cap 212. For example, adhesive can be applied between the cap 212 and the magnetic element 214 to bond the magnetic element 214 to the cap 212.

In some examples, the magnetic element 214 can be an electric magnet that is similar to the compressible energizing element 216. For example, the magnetic element can include a conductive material surrounding a cylinder that can generate a magnetic field when a current is applied to the conductive material. In some examples, the conductive material can be a conductive coil that conducts electrical current. In some examples, the magnetic element 214 can include a conductive coil or conductive spring element that can be utilized to generate a magnetic field. In some examples, the magnetic element 214 can be utilized to generate a first magnetic field and the compressible energizing element 216 can be utilized to generate a second magnetic field.

As described herein, the first magnetic field can interact with the second magnetic field to provide a particular level of resistance when the cap 212 is depressed in the direction of arrow 220. In these examples, the first magnetic field can be adjusted based on a first level of current applied to the magnetic element 214 and the second magnetic field can be adjusted based on a second level of current applied to the compressible energizing element 216. In this way, the key 201 can be more precisely adjusted with regards to resistance and/or response. As used herein, "response" refers to a quantity of time the key 201 takes to move from a depressed position to an original position.

In some examples, the cap 212 can be coupled to a first portion of a compressible energizing element 216 that surrounds the magnetic element 214. That is, the magnetic element 214 can be positioned within a cavity of the compressible energizing element 216. In some examples, the compressible energizing element 216 can be coupled to the cap 212 such that the compressible energizing element 216 is compressed when the cap 212 is moved in the direction of arrow 220. For example, the movement of the cap 212 can correspond to the compression or movement of the compressible energizing element 216. In some examples, the compressible energizing element 216 can include a second portion that is coupled to a base or key contact 222 of the key 201. In this way, the compressible energizing element 216 can be compressed between the cap 212 and the key contact 222 of the key 201.

In some examples, the compressible energizing element 216 can include a coil, wire, or other form of electrical material that can be provided with an electrical current to generate a magnetic field around the magnetic element 214. In some examples, the compressible energizing element 216 can include a first portion 216-1 of electrical material that is a distance from a second portion 216-2. When the compressible energizing element 216 surrounds the magnetic element 214, the first portion 216-1 can be separated by a space 217 along a surface of the magnetic element 214. In some examples, the space 217 can be a distance between the first portion 216-1 and the second portion 216-2. In some examples, the space 217 can decrease when the cap 212 is moved in the direction of arrow 220 such that the first portion 216-1 is closer to the second portion 216-2. That is, as the cap 212 is moved in the direction of arrow 220, the first portion 216-1 moves closer to the second portion 216-2. In some examples, when the first portion 216-1 is closer to the second portion 216-2, the magnetic field generated by the compressible energizing element 216 can be more dense within a particular area of the magnetic element 214. Inversely, the density of the magnetic field generated by the compressible energizing element 216 can be less dense when the first portion 216-1 is further away from the second portion 216-2 or when the space 217 is greater.

In some examples, the compressible energizing element can be positioned around a path (e.g., key path) of the magnetic element 214 to compress when the magnetic element 214 is moved in a first direction (e.g., in the direction of arrow 220) along the path and decompress when the magnetic element 214 is moved in a second direction (e.g., opposite direction of arrow 220) along the path. As used herein, the "path" can refer to the space that an object, such as the magnetic element 214, moves from a first position to a second position. As described herein, the magnetic element 214 can be a distance 219 from the key contact 222 or base of the key 201. FIG. 2 can illustrate when the key 201 is at an original position or deactivated position. That is, the key 201 can illustrate when a signal is not being sent to a computing device. In some examples, a force or pressure can be applied to the cap 212 to move the cap 212 and magnetic element in the direction of arrow 220 to lower the distance 219 past a threshold distance such that the magnetic field of the magnetic element 214 interacts with the key contact 222. The interaction between the magnetic element 214 and the key contact 222 can activate the key 201 and in response, the key 201 can send a particular signal to a computing device.

In some examples, the compressible energizing element 216 can be a elastic element such as a spring or coil that can provide a physical resistance between the cap 212 and the key contact 222. In some examples, the compressible energizing element 216 can be a spring that is made of a material that can generate a magnetic field when a current is applied to an end of the compressible energizing element 216. For example, the compressible energizing element 216 can be made of steel, iron, electroactive polymers, among other materials. As used herein, an "electroactive polymer" refers to a polymer that exhibits a change in size or shape when stimulated by an electric field. In these examples, the compressible energizing element 216 can provide resistance on the cap 212 even when electricity is not applied to the compressible energizing element 216.

In some examples, the key 201 can include an electronic device 218. As described herein, the electronic device 218 can be a device that can energize the compressible energizing element 216 such that the compressible energizing element 216 generates a magnetic field. In some examples, the electronic device 218 can be a coil energizer circuit. As used herein, a "coil energizer circuit" refers to a circuit that can generate an electric current and apply the electric current to the compressible energizing element 216. In some examples, the electrical device 218 is coupled to the compressible energizing element 216 by a compressible circuit.

In some examples, the electronic device 218 can be a compressible device. In some examples, the electronic device 218 can be similar to the compressible energizing element 216 and compress with the movement of the cap 212 in the direction of arrow 220. In this way, the length of the electronic device 218 can extend from the cap 212 to the key contact 222 despite the location of the cap 212. That is, the electronic device 218 can be compressed and extended to stay in contact with the cap 212 and the key contact 222 when the key 201 is moved in the direction of arrow 220 and moved in the direction opposite of arrow 220.

In some examples, the electronic device 218 can be positioned between the compressible energizing element 216 and the magnetic element 214. When the electronic device 218 is compressible, the electronic device 218 can be maintain a position between the compressible energizing element 216 and the magnetic element 214. In this way, the electronic device 218 can maintain a first connection with a first end of the compressible energizing element 216 and a second connection with a second end of the compressible energizing element 216.

Figure 3:
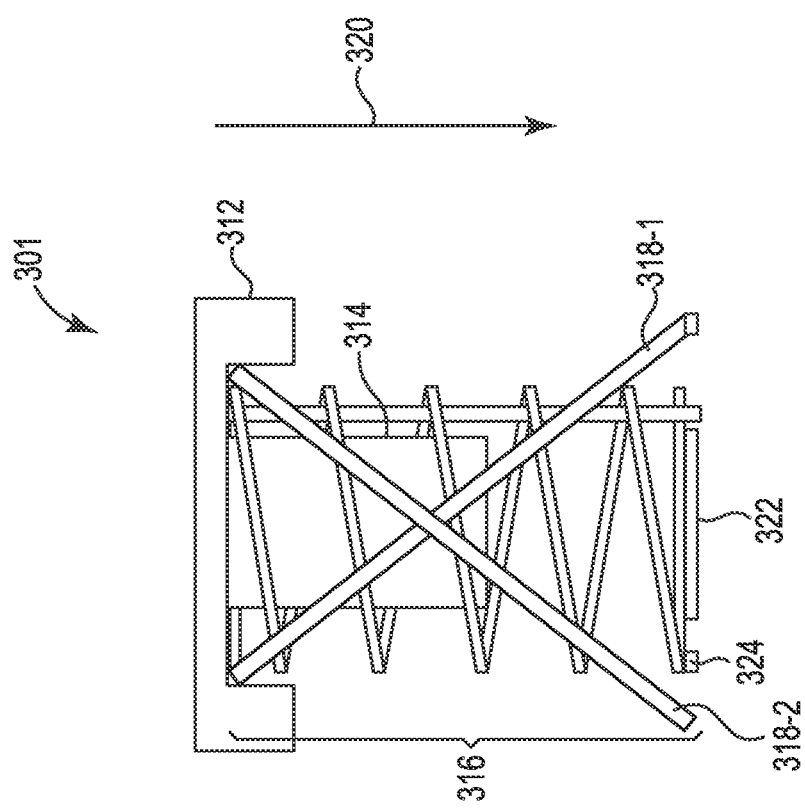
FIG. 3 illustrates an example of a key that includes a compressible energizing element.

FIG. 3 illustrates an example of a key 301 that includes a compressible energizing element 316. In some examples, the key 301 can be a device that can be a portion of a keyboard or other input device for a computing device (e.g., computing device 102 as illustrated in FIG. 1, etc.). In some examples, the key 301 can be the same or similar device as key 201 as illustrated in FIG. 2, and/or device 101 as illustrated in FIG. 1. For example, the key 301 can include a cap 312 that can be utilized to receive a force from a user or device. In some examples, applying pressure on the cap 312 can move the cap 312 in the direction of arrow 320.

In some examples, the cap 312 can be coupled to a magnetic element 314. As described herein, the magnetic element 314 can be a permanent magnet that can generate a magnetic field without an applied electrical current. In some examples, the magnetic element 314 can be permanently or substantially permanently coupled to a surface of the cap 312. For example, adhesive can be applied between the cap 312 and the magnetic element 314 to bond the magnetic element 314 to the cap 312.

In some examples, the cap 312 can be coupled to a first portion of a compressible energizing element 316 that surrounds the magnetic element 314. That is, the magnetic element 314 can be positioned within a cavity of the compressible energizing element 316. In some examples, the compressible energizing element 316 can be coupled to the cap 312 such that the compressible energizing element 316 is compressed when the cap 312 is moved in the direction of arrow 320. For example, the movement of the cap 312 can correspond to the compression or movement of the compressible energizing element 316. In some examples, the compressible energizing element 316 can include a second portion that is coupled to a base or key contact 322 of the key 301. In this way, the compressible energizing element 316 can be compressed between the cap 312 and the key contact 322 of the key 301.

As described herein, the compressible energizing element 316 can include a coil, wire, or other form of electrical material that can be provided with an electrical current to generate a magnetic field around the magnetic element 314. In some examples, the compressible energizing element 316 can be an elastic element such as a spring or coil that can provide a physical resistance between the cap 312 and the key contact 322. In some examples, the compressible energizing element 316 can be a spring that is made of a material that can generate a magnetic field when a current is applied to an end of the compressible energizing element 316.

In some examples, the key 301 can include an electronic device 318-1, 318-2. As described herein, the electronic device 318-1, 318-2 can be a device that can energize the compressible energizing element 316 such that the compressible energizing element 316 generates a magnetic field. In some examples, the electronic device 318-1, 318-2 can be a coil energizer circuit. In some examples, the electronic device 318-1, 318-2 can be a scissor compressible device (e.g., scissor circuit, etc.). In some examples, the electronic device 318-1, 318-2 can include a first portion of the electronic device 318-1 and a second portion of the electronic device 318-2. In some examples, the first portion of the electronic device 318-1 and the second portion of the electronic device 318-2 can be positioned in an opposite direction of each other such that the first portion of the electronic device 318-1 extends from a first side of the cap 312 to a second side of the key contact 322 and the second portion of the electronic device 318-2 extends from a second side of the cap 312 to a first side of the key contact 322.

In this way, the first portion of the electronic device 318-1 and the second portion of the electronic device 318-2 can be moveably coupled to the key contact 322 and move away from each other when a force is applied to the cap 312 in the direction of arrow 320. This can provide the first portion of the electronic device 318-1 and the second portion of the electronic device 318-2 to be compressed when the force is applied to the cap 312, which can allow the magnetic element to move closer to the key contact 322. In some examples, the first portion of the electronic device 318-1 and the second portion of the electronic device 318-2 can be moveably coupled by being positioned within a trench that can allow the first portion of the electronic device 318-1 and the second portion of the electronic device 318-2 to move within the trench. In some examples, the trench for the first portion of the electronic device 318-1 and the second portion of the electronic device 318-2 can be a ground 324 to allow the first portion of the electronic device 318-1 and the second portion of the electronic device 318-2 to be connected to a ground 324 of a circuit. In some examples, the compressible energizing element 316 can also be connected to the ground 324 of the circuit. As used herein, the "ground", such as ground 324, refers to an electrical ground is a common return path for an electrical current or direct physical connection to the Earth.

Figure 4:
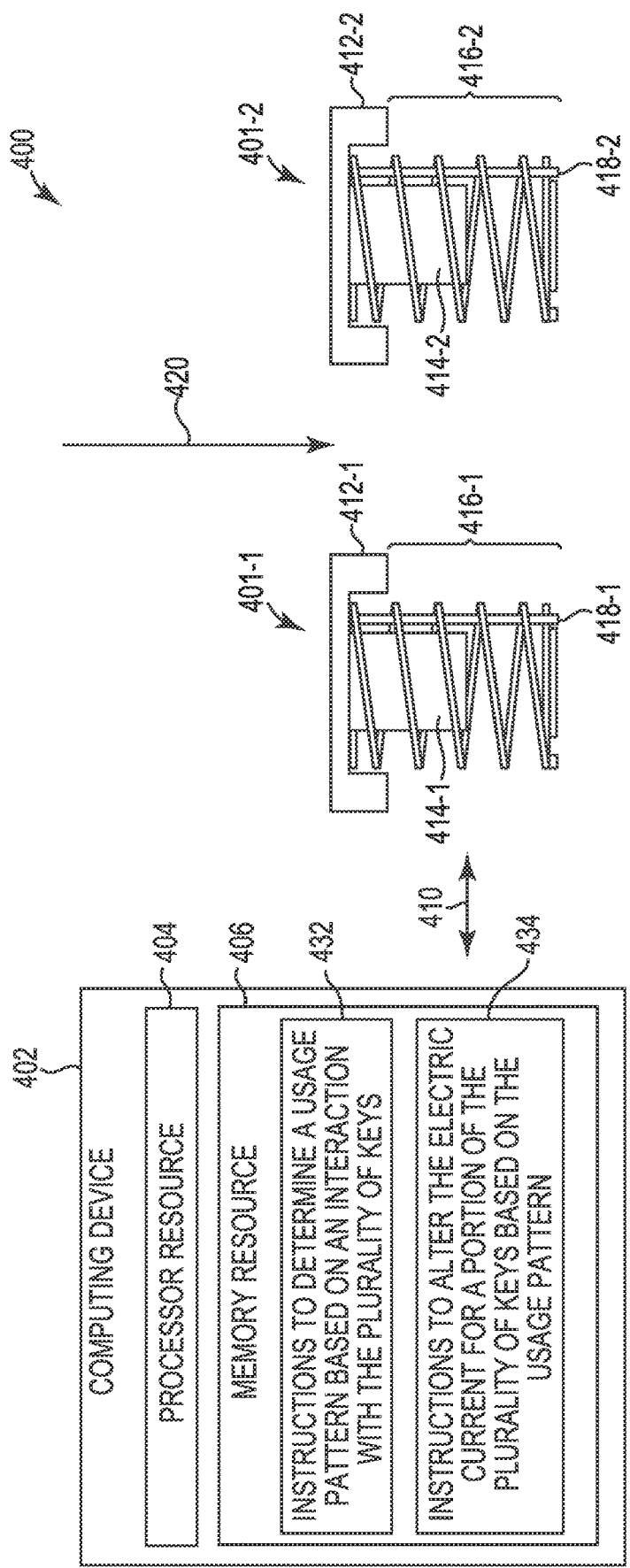
FIG. 4 illustrates an example of a system including devices that include compressible energizing elements.

FIG. 4 illustrates an example of a system 400 including keys 401-1, 401-2 that include compressible energizing elements 416-1, 416-2. In some examples, the system 400 can include a computing device 402 communicatively coupled to the keys 401-1, 401-2 by a communication path 410. In some examples, the computing device 402 can be utilized to receive signals generated by the keys 401-1, 401-2 and/or utilized to alter a current provided to the compressible energizing elements 416-1, 416-2 of the keys 401-1, 401-2.

The keys 401-1, 401-2 can be the same or similar devices as key 301 as illustrated in FIG. 3, key 201 as illustrated in FIG. 2, and/or device 101 as illustrated in FIG. 1. In some examples, the keys 401-1, 401-2 can include corresponding caps 412-1, 412-2, corresponding compressible energizing elements 416-1, 416-2, corresponding magnetic elements 414-1, 414-2, and/or corresponding electric devices 418-1, 418-2. In some examples, the keys 401-1, 401-2 can be part of a keyboard that includes a plurality of additional devices.

In some examples, the computing device 402 can include a processor resource 404 communicatively coupled to a memory resource 406. As described further herein, the memory resource 406 can include instructions 432, 434 that can be executed by the processor resource 404 to perform particular functions. In some examples, the computing device 402 can be associated with the keys 401-1, 401-2. For example, the computing device 402 can be utilized to execute instructions associated with functions of the keys 401-1, 401-2. In some examples, the computing device 402 can be local or remote to the keys 401-1, 401-2.

In some examples, the computing device 402 can be communicatively coupled to the keys 401-1, 401-2 through a communication path 410. In these examples, the signals can be utilized to provide communication between different devices and/or components within a device. For example, the computing device 402 can utilize the communication path 410 to instruct the electrical devices 418-1, 418-2 to alter a current or voltage provided to the compressible energizing elements 416-1, 416-2.

In some examples, the computing device 402 can include instructions 432 that can be executed by a processor resource 404 to determine a usage pattern based on an interaction with the plurality of keys 401-1, 401-2. As described herein, a usage pattern can include a description of the usage of the plurality of keys 401-1, 401-2 over a period of time. The usage pattern can include a relative force applied to the plurality of keys 401-1, 401-2, a quantity of use for each of the plurality of keys 401-1, 401-2, and/or other features of use during the period of time. In some examples, the period of time can include displayed instructions to type a particular quantity of words or phrases. In these examples, the usage pattern can include a quantity of errors when typing the quantity of words or phrases.

In some examples, the computing device 402 can include instructions 432 that can be executed by a processor resource 404 to alter the electric current for a portion of the plurality of keys 401-1, 401-2 based on the usage pattern. In some examples, the usage pattern can include a typing rate for different key strokes that correspond to different keys of the plurality of keys 401-1, 401-2. In this way, the computing device 402 can utilize the usage pattern to identify a first key 401-1 or a first portion of keys that can include a first current provided to the first compressible energizing element 416-1 and utilize the usage pattern to identify a second key 401-2 or a second portion of keys that can include a second current provided to the second compressible energizing element 416-2.

In some examples, the computing device 402 can include instructions that can be executed by a processor resource 404 to determine a plurality of errors during a time period of interactions with the plurality of keys and generate the usage pattern based on the plurality of errors during the time period. As described herein, the plurality of errors can be based on a particular set of words or phrases to be typed using the plurality of keys 401-1, 401-2. Determining the quantity of errors can also be based on a quantity of times a backspace key is utilized over a period of time. In some examples, the computing device 402 can utilize machine learning to determine different resistances for the plurality of keys 401-1, 401-2 based on the usage pattern to improve the usage experience for a particular user utilizing the plurality of keys 401-1, 401-2 during the period of time.

In some examples, the computing device 402 can utilize the usage pattern to identify that a different user is using the keyboard and adjust the current or voltage applied to the corresponding compressible energizing elements 416-1, 416-2 based on a current usage pattern. That is, the computing device 402 can periodically initiate a monitoring period and monitor a usage pattern of the plurality of keys 401-1, 401-2. In this way, a plurality of users can utilize the same plurality of keys 401-1, 401-2 and have a customized experience based on the usage pattern of a particular user.

In some examples, the computing device 402 can include instructions that can be executed by a processor resource 404 to increase the electrical current to increase a resistance of the keyboard key 401-1, 401-2 and decrease the electrical current to decrease the resistance of the keyboard key 401-1, 401-2. In some examples, the resistance corresponds to a quantity of pressure applied to the key cap 412-1, 412-2 to provide the interaction between the magnetic element 414-1, 414-2 and the key contact. In other words, the electric current applied to a compressible energizing element 416-1, 416-2 corresponds to a resistance level for a corresponding key of the plurality of keys 401-1, 401-2. As described herein, the electric current is adjusted independently for each of the plurality of keys 401-1, 401-2 to alter a resistance associated with each of the plurality of keys 401-1, 401-2.

In some examples, the keyboard keys 401-1, 401-2 can be independently adjusted based on a corresponding function for a particular application utilized by the computing device 402. For example, a particular application (e.g., game, software, video, etc.) can be executing on the computing device 402. In this example, the computing device 402 can determine that the key 401-1 may not be utilized and/or may be a key that corresponds to an unintended use for the particular application. In this example, the computing device 402 can alter a current applied to the compressible energizing element 416-1 and/or the magnetic element 414-1 to increase a resistance for the key 401-1. In this way, it can be more difficult to depress the key 401-1 in the direction of arrow 420, which can prevent an unintended press of the key 401-1.

In some examples, the computing device 402 can determine that the key 401-2 is utilized for quick depressions or rapid depressions. In these examples, the computing device 402 can alter a current level of the compressible energizing element 416-2 and/or the magnetic element 414-2 to provide a greater response of the key 401-2 and/or a lower resistance to allow for quicker depression of the key 402-2. In this way, a user can more actively utilize key 401-2 and not have to worry about incidentally depressing key 401-1. This can provide a customized keyboard experience for each of the plurality of keys 401-1, 401-2 based on an application being executed by the computing device 402.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" refers to one such thing or more than one such thing.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 302 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples, and data provide a description of the system and method of the disclosure. Since many examples can be made without departing from the spirit and scope of the system and method of the disclosure, this specification merely sets forth some of the many possible example configurations and implementations.

The invention claimed is:

1. A device, comprising:
   a magnetic element coupled to a cap;
   a compressible energizing element surrounding the magnetic element such that the compressible energizing element is positioned around a path of the magnetic element to compress when the magnetic element is moved in a first direction along the path and decompress when the magnetic element is moved in a second direction along the path;
   an electrical device coupled to the compressible energizing element to provide a current; and a processor resource to:
adjust a current applied to the compressible energizing element based on a selected resistance level.

2. The device of claim 1, wherein the processor resource is to adjust the current applied to the compressible energizing element to alter a magnetic field of the compressible energizing element.

3. The device of claim 2, wherein the processor resource is to alter the magnetic field of the compressible energizing element based on a compression level of the compressible energizing element.

4. The device of claim 1, wherein the electrical device is coupled to the compressible energizing element by a compressible circuit.

5. The device of claim 1, wherein the electrical device is coupled to the compressible energizing element by a scissor circuit.

6. The device of claim 1, wherein the compressible energizing element is an energized coil spring that allows the magnetic element to move within the energized coil spring as pressure is applied to the cap.

7. The device of claim 1, wherein the magnetic element interacts with a contact when the cap is depressed and the compressible energizing element is compressed.

8. A keyboard key, comprising:
a key cap coupled to a magnetic element;
a key contact to determine when the keyboard key is depressed based on an interaction with the magnetic element;
a compressible energizing element positioned around a path of the magnetic element to compress when the magnetic element is moved in a first direction along the path and decompress when the magnetic element is moved in a second direction along the path; and
an electrical device to apply electrical current to the compressible energizing element.

9. The keyboard key of claim 8, wherein a density of a magnetic field generated by the compressible energizing element increases when compressed and decreases when decompressed.

10. The keyboard key of claim 8, comprising a processor resource to increase the electrical current to increase a resistance of the keyboard key and decrease the electrical current to decrease the resistance of the keyboard key.

11. The keyboard key of claim 10, wherein the resistance corresponds to a quantity of pressure applied to the key cap to provide the interaction between the magnetic element and the key contact.

12. A keyboard, comprising:
a plurality of keys, comprising:
a magnetic portion to interact with a key contact when depressed along a key path;
a compressible energizing element to surround a portion of the key path and altered when the magnetic portion is moved along the key path; and
an electrical device to apply electric current to the compressible energizing element to generate a magnetic field; and
a processor resource to:
determine a usage pattern based on an interaction with the plurality of keys; and
alter the electric current for a portion of the plurality of keys based on the usage pattern.

13. The keyboard of claim 12, wherein the processor resource is to determine a plurality of errors during a time period of interactions with the plurality of keys and generate the usage pattern based on the plurality of errors during the time period.

14. The keyboard of claim 12, wherein the electric current applied to the compressible energizing element corresponds to a resistance level for a corresponding key of the plurality of keys.

15. The keyboard of claim 12, wherein the processor resource is to alter the electric current independently for each of the plurality of keys to alter a resistance associated with each of the plurality of keys.

16. The device of claim 1, wherein the device comprises a keyboard.

17. The device of claim 1, wherein the electrical device comprises an electrical generator.

18. The keyboard key of claim 8, wherein the electrical device is coupled to the compressible energizing element by a scissor circuit or a compressible circuit.

19. The keyboard of claim 12, wherein the electrical device is coupled to the compressible energizing element by a scissor circuit.

20. The keyboard of claim 12, wherein the electrical device is coupled to the compressible energizing element by a compressible circuit.

* * * * *